(12) United States Patent
Radosavljevic et al.

(10) Patent No.: US 7,042,687 B2
(45) Date of Patent: May 9, 2006

(54) MISWIRE PROTECTION SWITCH COMPRESSION SPRING

(75) Inventors: Dejan Radosavljevic, LaFayette, NY (US); Gerald R. Savicki, Jr., Syracuse, NY (US); Richard Weeks, Little York, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 440 days.

(21) Appl. No.: 10/366,088

(22) Filed: Feb. 12, 2003

(65) Prior Publication Data

US 2004/0027739 A1 Feb. 12, 2004

Related U.S. Application Data

(60) Provisional application No. 60/356,522, filed on Feb. 13, 2002.

(51) Int. Cl.
*H02H 9/08* (2006.01)

(52) U.S. Cl. .......................................... 361/42; 361/43
(58) Field of Classification Search .................. 361/42, 361/43, 44, 45, 46–50, 114, 115; 324/426, 324/500, 523
See application file for complete search history.

(56) References Cited

U.S. PATENT DOCUMENTS

| | | | | |
|---|---|---|---|---|
| 4,831,496 A | * | 5/1989 | Brant et al. | 361/730 |
| 5,642,248 A | * | 6/1997 | Campolo et al. | 361/42 |
| 6,052,265 A | * | 4/2000 | Zaretsky et al. | 361/42 |
| 6,252,407 B1 | * | 6/2001 | Gershen | 324/509 |
| 6,262,871 B1 | * | 7/2001 | Nemir et al. | 361/42 |

* cited by examiner

*Primary Examiner*—Brian Sircus
*Assistant Examiner*—Danny Nguyen
(74) *Attorney, Agent, or Firm*—Bond, Schoeneck & King PLLC; Daniel P. Malley

(57) ABSTRACT

The present invention is directed to a ground fault circuit interrupt (GFCI) device. The GFCI device includes a GFCI device housing. A GFCI circuit is enclosed within GFCI device housing. The GFCI circuit is configured to detect a ground fault condition. A second detection circuit is coupled to the GFCI circuit and disposed within the GFCI device housing. The second detection circuit includes a switch element configured to be in an open position during at least one post-manufacture test procedure and configured to be in a closed position during usage. A protection switch is disposed on the exterior of the GFCI device housing and operatively coupled to the switch element. The protection switch is configured to allow a user to throw the switch element into the closed position without accessing the interior of the GFCI device housing.

28 Claims, 5 Drawing Sheets

MISWIRE PROTECTION SWITCH COMPRESSION SPRING

CROSS-REFERENCE TO RELATED APPLICATIONS

This application claims priority under 35 S.C. 119(e) based on U.S. Provisional Application Ser. No. 60/356,522 filed on Feb. 13, 2002, the content of which is relied upon and incorporated herein by reference in its entirety.

BACKGROUND OF THE INVENTION

1. Field of the Invention

The present invention relates generally to electrical devices, and particularly to ground fault circuit interrupter (GFCI) devices.

2. Technical Background

By way of background, power is provided to electrical appliances through a pair of electrical conductors connected to a power source provided by the local power utility. One conductor is a "hot" wire and the other conductor is a neutral conductor. The hot conductor is also commonly referred to as the line. The line and the neutral provide the load (e.g. the appliance) with 120 volts of alternating current (VAC) or 240VAC. Ground faults occur when there is an imbalance between the current flowing in the line and the neutral, or if the neutral becomes grounded at the load.

A GFCI is a safety device that, if used properly, may help prevent electrocution because of ground faults. Ground fault conditions pose a significant threat to safety and may result in serious injury or death. The GFCI is configured to automatically detect the fault condition and open the circuit to eliminate the fault condition. GFCIs can typically detect the presence of a ground fault as small as a few milliamps and open the circuit within a fraction of a second to eliminate the dangerous fault condition.

In a conventional GFCI, current differentials between the line and neutral are sensed by a current differential sensing transformer. Grounded neutral conditions are sensed by a second ground neutral transformer. Both of the transformers are coupled to a fault detection circuit. Upon detecting a ground fault condition, the fault detection circuit directs a solenoid to actuate a circuit breaker. The circuit breaker, in turn, opens the circuit to eliminate the dangerous condition. Unfortunately, the above described conventional GFCI has limited functionality that is unable to cope with certain problems.

One such problem includes the possibility of an installer mis-wiring the line/load in the field. A variety of methods are used to prevent or attempt to prevent mis-wiring with varying levels of success. Labels and installation instruction sheets have been used to prevent mis-wiring. Of course, instructions can always be ignored by the installer. Another potential problem includes the possibility of solenoid failure. Obviously, if the solenoid fails, or if the circuit driving the solenoid fails, the GFCI will be inoperable, and hazardous ground fault conditions will go undetected. Preventing the problems associated with a defective solenoid driving device is inherently more problematic.

GFCIs have been provided with mis-wiring protection circuits, and built-in means for detecting defective internal GFCI components, such as a defective solenoid. However, these circuits have proved to be problematic during some test procedures. First, mis-wiring protection circuits often produce differential currents that skew test results. Also, some test procedures may-cause the mis-wiring protection circuit to burn out, making the device unsuitable for sale. What further exacerbates the problem is that certain standards, such as Underwriters Laboratories Standard 943 (UL 943), do not allow the manufacturer to open the GFCI device after the device has been tested. Thus, if a circuit does fail during testing, the device must be scrapped.

Therefore, it is desirable to provide a GFCI device that is amenable to rigorous testing, such as the test procedures provided by UL 943.

SUMMARY OF THE INVENTION

The present invention addresses the aforementioned needs. The GFCI of the present invention includes a mis-wiring protection circuit, and a circuit for detecting defective internal GFCI components. The present invention is amenable to testing, in particular, for test procedures complying with Underwriters Laboratories Standard 943 (UL 943).

One aspect of the present invention is a ground fault circuit interrupt (GFCI) device. The GFCI device includes a GFCI device housing. A GFCI circuit is enclosed within GFCI device housing. The GFCI circuit is configured to detect a ground fault condition. A second detection circuit is coupled to the GFCI circuit and disposed within the GFCI device housing. The second detection circuit includes a switch element configured to be in an open position during at least one post-manufacture test procedure and configured to be in a closed position during usage. A protection switch is disposed on the exterior of the GFCI device housing and operatively coupled to the switch element. The protection switch is configured to allow a user to throw the switch element into the closed position without accessing the interior of the GFCI device housing.

In another aspect, the present invention includes a method for making a ground fault circuit interrupt (GFCI) device. The method includes the steps of providing a housing. A GFCI circuit is enclosed within GFCI device housing. The GFCI circuit is configured to detect a ground fault condition. The GFCI circuit includes a second detection circuit. The second detection circuit includes a switch element that is in a closed position during usage. A protection switch is disposed on the exterior of the housing. The protection switch is operatively coupled to the switch element. At least one test procedure is performed with the switch element in an open position. The GFCI circuit, the second detection circuit, and the switch element are inaccessibly disposed within the housing. The protection switch is actuated to throw the switch element into the closed position.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
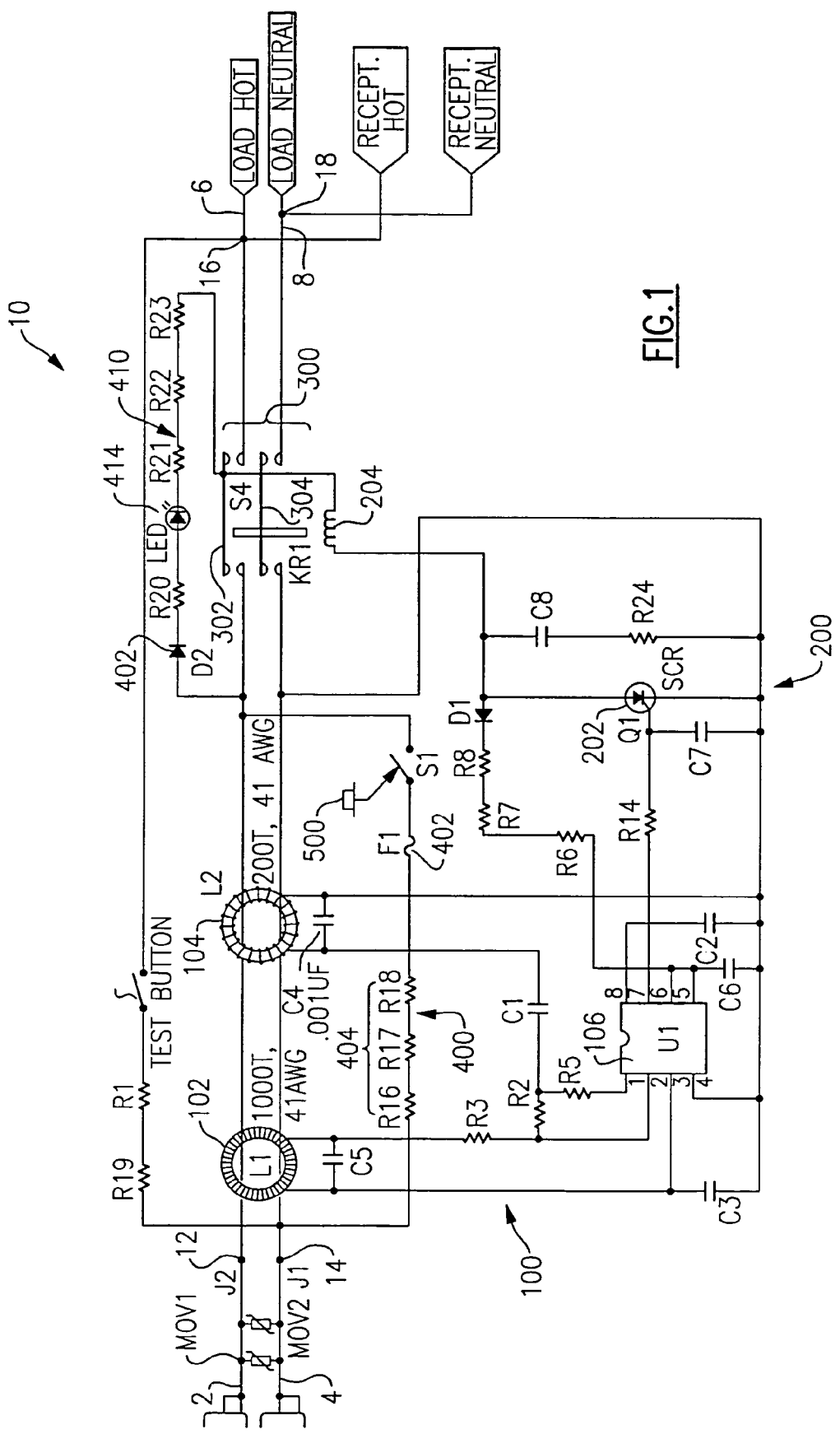
FIG. 1 is a schematic view of the GFCI in accordance with an embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the GFCI of the present invention is shown in FIG. 1, and is designated generally throughout by reference numeral 10.

In accordance with the invention, the present invention is directed to a ground fault circuit interrupt (GFCI) device. The GFCI device includes a GFCI device housing. A GFCI circuit is enclosed within GFCI device housing. The GFCI circuit is configured to detect a ground fault condition. A second detection circuit is coupled to the GFCI circuit and disposed within the GFCI device housing. The second detection circuit includes a switch element configured to be in an open position during at least one post-manufacture test procedure and configured to be in a closed position during usage. A protection switch is disposed on the exterior of the GFCI device housing and operatively coupled to the switch element. The protection switch is configured to allow a user to throw the switch element into the closed position without accessing the interior of the GFCI device housing. Thus, the GFCI of the present invention is amenable to post-manufacture testing. In particular, the GFCI of the present invention is amenable to post-manufacture testing complying with Underwriters Laboratories Standard 943 (UL 943).

As embodied herein, and depicted in FIG. 1, a schematic view of the GFCI 10 in accordance with one embodiment of the present invention is disclosed. In general, GFCI 10 includes fault detection circuit 100, latching circuit 200, circuit breaker 300, mis-wiring detection circuit 400, and fault indicator circuit 410. Mis-wiring circuit protection switch 500 is coupled to mis-wiring detection circuit 400.

Fault detection circuit 100 is configured to detect ground fault conditions and grounded neutral conditions. Specifically, fault detection circuit 100 includes current differential sense transformer 102 and grounded neutral transformer 104. Current differential sense transformer 102 is configured to sense the current differential between hot conductor (line) 2 and the neutral conductor 4. The secondary windings of transformer 102 are coupled to fault detector IC 106. Ground neutral transform 104 senses the presence of grounded neutral conditions. The secondary windings of transformer 104 are also coupled to fault detector IC 106. Capacitors C4 and C5 are noise suppression capacitors that are selected to prevent false GFCI triggering that may otherwise occur in response to electrical noise or other disturbances. Fault detector IC 106 monitors the secondary transformer windings of both transformer 102 and transformer 104. IC 106 provides an output pulse on pin 7 in response to detecting a fault condition.

Latching circuit 200 is coupled to fault detection circuit 100. In particular, output pin 7 of IC 106 is coupled to silicon controlled rectifier (SCR) 202 in latching circuit 200. SCR 202 is coupled to solenoid 204. SCR 202 de-energizes solenoid 204 in the presence of a ground fault.

Breaker circuit 300 is coupled to the latching circuit 200. Breaker circuit 300 includes breaker hot bus bar 302 and breaker neutral bus bar 304, both of which are coupled to solenoid 204. Again, in the presence of a fault, solenoid 204 is de-energized and breaker circuit 300 is tripped. Hot bus bar 302 is de-coupled from hot load line 6 and neutral bus bar 304 is de-coupled from neutral load line 8.

Mis-wiring protection circuit 400 includes fault resistance 404 which includes resistors R16, R17, and R18 in series with fuse F1 and switch element S1. These elements are disposed on the line side of GFCI 10 and connected to the line side of hot bus bar 302. If GFCI is mis-wired, e.g., hot contact 16 on the load side is coupled to line 2 and the neutral contact on the load side is connected to line neutral 4, and GFCI 10 is tripped. Each time a user attempts to reset GFCI 10 in the mis-wired condition, GFCI 10 immediately trips. Fault resistance 404 functions to create a differential current on the primary of transformer 102 in excess of a fault threshold, which is typically 6 mA. Referring back to switch element S1, this circuit element has been included to facilitate post-manufacture testing, which will be discussed in more detail below.

Fault indicator circuit 410 is connected in parallel with hot bus bar circuit 302. Indicator circuit 410 includes a diode D2 in series with resistors R20, R21, R22, and R23, and LED 414. When the properly wired GFCI 10 trips and the internal components of GFCI 10 are not defective, e.g. SCR 202 is not shorted out, bus bar 502 is removed from contact with line hot. Current then flows through indicator circuit 410. Current flows through solenoid 204, diode D1, and resistors R6, R7, R8 to provide the power to illuminate LED 414 to indicate that GFCI 10 is tripped. Nominal current through the LED is about 4 mA.

Indicator circuit 410 works in conjunction with GFCI fault detection circuitry 100 to power indicator 414, to detect internal GFCI component failure, and to protect coil 204. When the properly wired GFCI 10 trips due to the SCR 202 shorting, current flows through the indicator circuit 410, coil 204, and then through the shorted SCR 202. Nominal current in this scenario is about 10 mA. Coil 204 is protected from burning out by series resistors R20, R21, R22, and R23. If GFCI 10 is tripped when SCR 202 is shorted, LED 414 is protected by diode D1 which rectifies (half-wave) the voltage, and cuts the power across series resistors R20, R21, R22, and R23 in half.

When GFCI 10 is mis-wired, LED 414 is not lit because there is no path for the current to take when the device is tripped. Thus, if the device is tripped and no light appears, the installer knows that the device is mis-wired.

Those of ordinary skill in the art will recognize that any suitable GFCI circuit may be employed. Reference is made to U.S. patent application Ser. No. 09/971,530, which is incorporated herein by reference as though fully set forth in its entirety, for a more detailed explanation of various GFCI configurations.

Referring back to post-manufacture testing procedures, Underwriters Laboratories Standard 943 does not allow the manufacturer to open the GFCI device after the device has been tested. However, UL 943 requires certain procedures that may cause fault resistance series resistors R16, R17, and R18 to burn out, making the device unsuitable for sale. Furthermore, UL 943 also requires that the differential current produced by series resistors R16, R17, and R18 do not affect any of the test results.

Referring back to FIG. 1, the solution is to place switch element S1 in series with resistors R16, R17, and R18. However, when the GFCI is loaded into a piece of test equipment designed to perform the required manufacturing tests, switch S1 is in an open position. Thus, the differential current circuit path of circuit 400 is also open. Manufacturing testing can now be performed without any circuit effect from this path, without burning out fault resistance series resistors R16, R17, and R18. Subsequently, switch element S1 is actuated using protection switch 500, and placed in the closed position, reconnecting the differential current circuit path. Line voltage is then applied to the load contacts to simulate a mis-wired condition. If GFCI 10 and mis-wiring detection circuit 400 are functional, the mis-wired condition will cause the GFCI to trip. Mis-wiring circuit protection switch 500 will be explained as follows.

Figure 2:
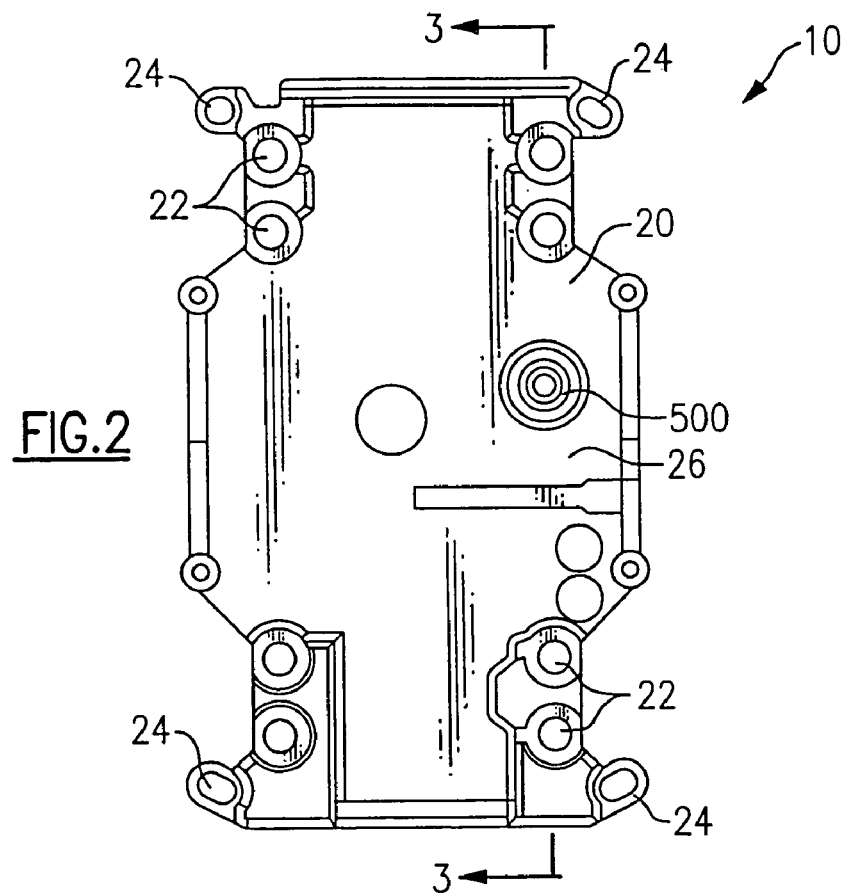
FIG. 2 is a plan view of the GFCI enclosure in accordance with an embodiment of the present invention.
Figure 3:
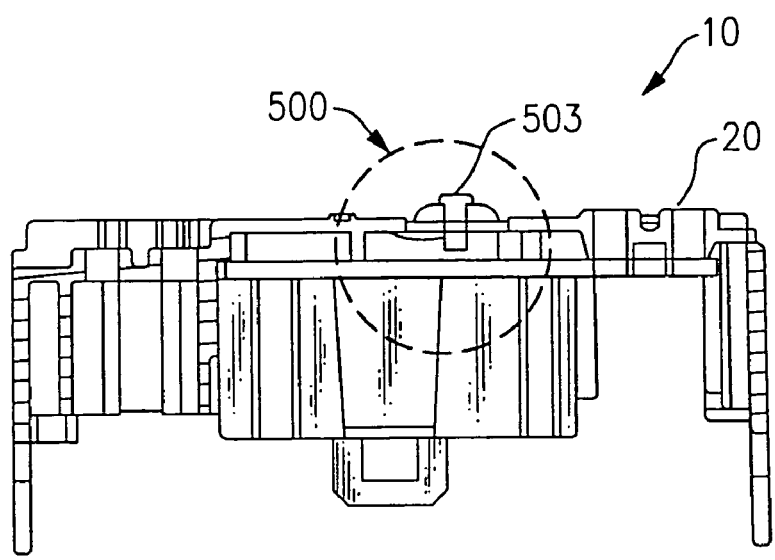
FIG. 3 is a side elevation view of the top portion of the GFCI enclosure depicted in FIG. 1.

As embodied herein, and depicted in FIG. 2, a plan view of GFCI housing enclosure 20 in accordance with an embodiment of the present invention is disclosed. Those of ordinary skill in the art will recognize that the back portion of enclosure 20, which normally accommodates wall plate straps is not shown for ease of illustration. As shown, enclosure 20 includes a plurality of back wire holes 22, and back-portion connectors 24. Connectors 24 are used to mount the front portion of enclosure 20 to the above mentioned back portion. Enclosure 20 conveniently includes mis-wiring circuit protection switch 500 disposed on the front of the enclosure. Referring to FIG. 3, a cross-sectional view of the top portion of the GFCI enclosure 20 is shown. In particular, the cross-section is taken through protection switch 500, which includes actuator button 502.

Figure 4:
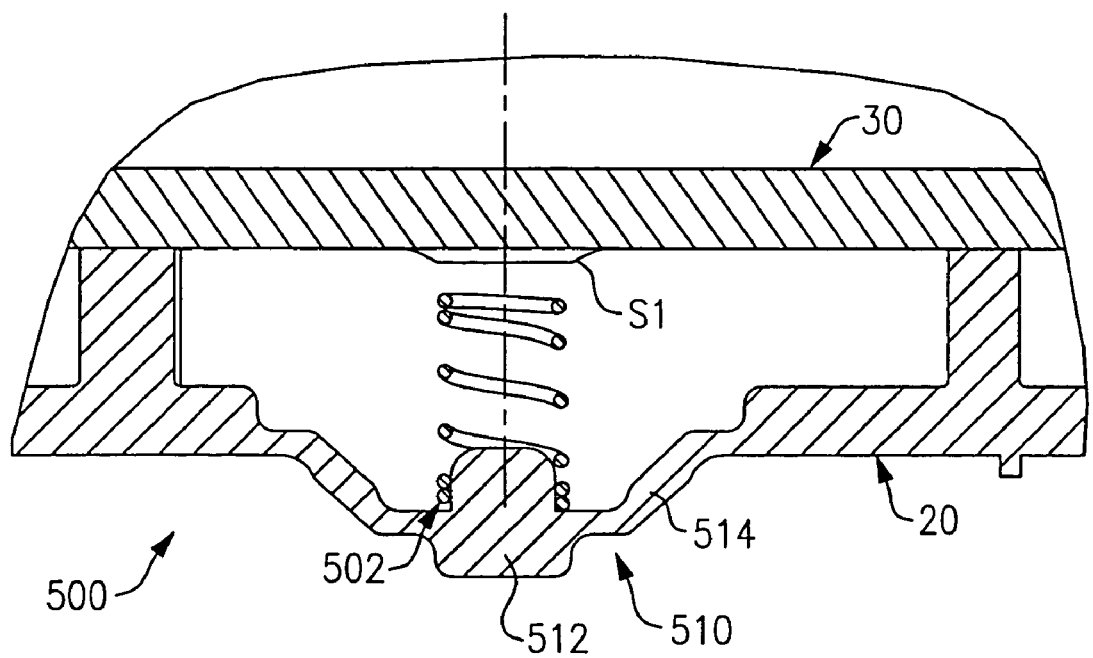
FIG. 4 is a cross-sectional view of the mis-wiring circuit protection switch taken through line A—A in FIG. 1.

Referring to FIG. 4, a detail view of protection switch 500 is shown in accordance with a first embodiment of the invention. In this view, protection switch 500 is shown before actuation. Protection switch 500 includes bubble member 510. Bubble member 510 includes an actuation button 512 and domed wall member 514. Domed wall member 514 couples actuation button 512 to enclosure 20. Spring 502 fits over actuation button 512, and is interposed between actuation button 512 and the switch element S1. As in the embodiment shown in Figure, switch element S1 is configured as a flexible conductive switch arm mounted on PC board 30. In another embodiment, switch S1 may be incorporated as a part of spring 502. In the latter embodiment, switch S1 contacts are disposed on PC board 30.

Figure 5:
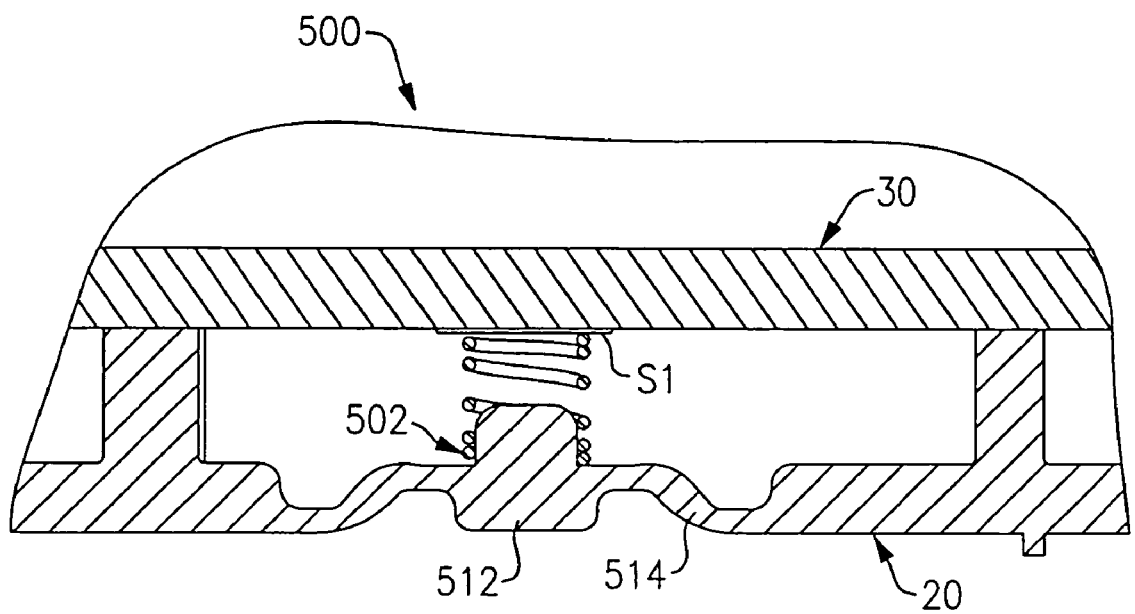
FIG. 5 is a cross-sectional view of the mis-wiring circuit protection switch depicted in FIG. 4 in an actuated position.

FIG. 5 shows protection switch 500 in an actuated position. When a user depresses actuation button 512, spring 502 is compressed, and switch element S1 is thrown into the closed position. As shown, when actuation button 512 is compressed, domed wall member 514 is permanently deformed. Thereafter, switch element S1 is permanently in the closed position.

Figure 6:
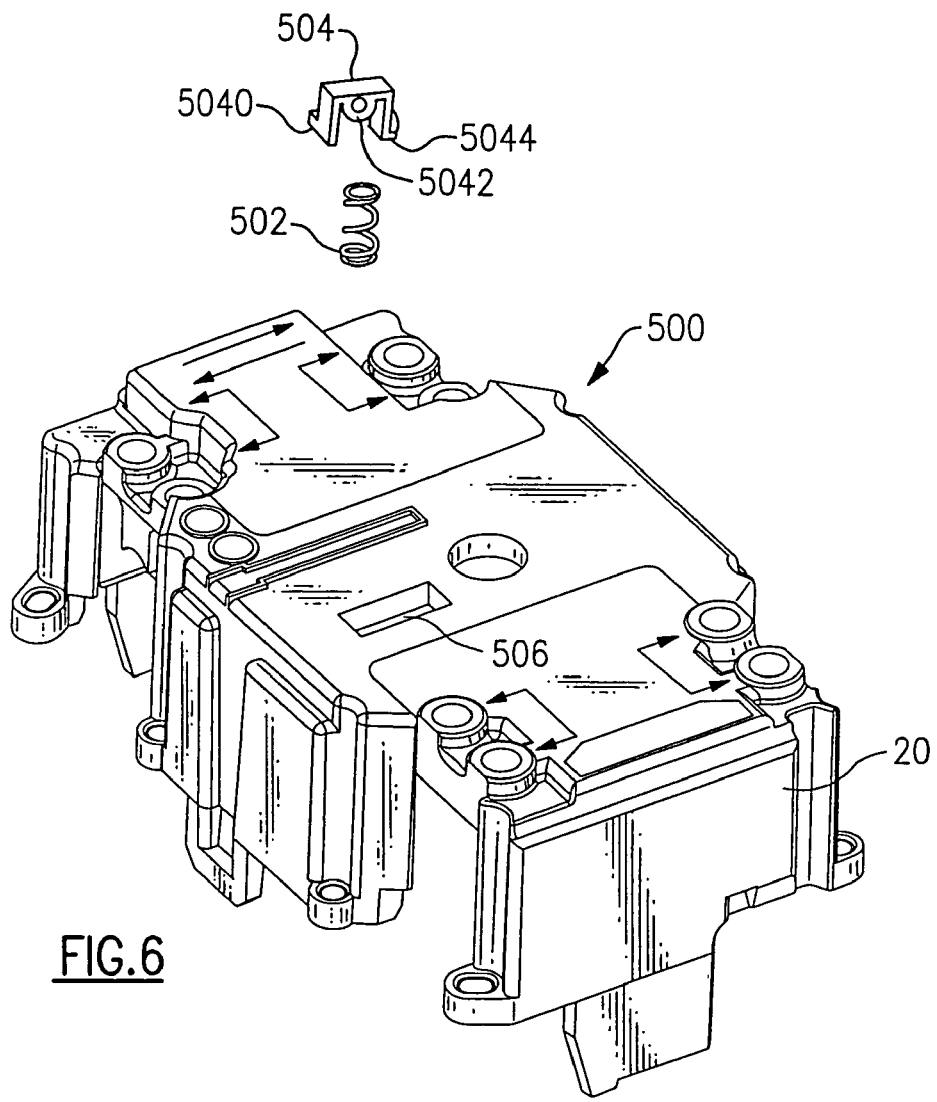
FIG. 6 is a perspective view of the top portion of the GFCI enclosure in accordance with a second embodiment of the present invention.
Figure 7:
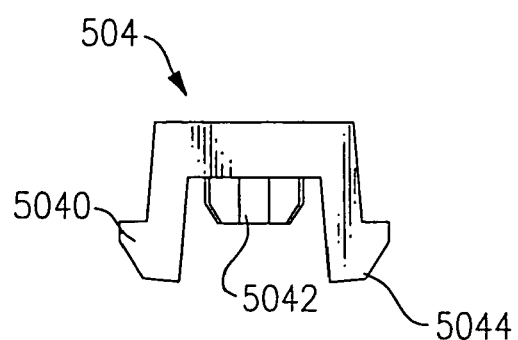
FIG. 7 is a detail view of the actuation plug depicted in FIG. 6.

As embodied herein, and depicted in FIG. 6, a perspective view of protection switch 500 in accordance with a second embodiment of the present invention is disclosed. Protection switch 500 includes actuation plug 504 and spring member 502. Initially, actuation plug 504 is partially inserted into opening 506 in device housing 20. FIG. 7 is a detail view of the actuation plug 504 depicted in FIG. 6. Plug 504 includes snap member 5040 and snap member 5044. Plug 504 also includes a dimpled portion 5042 which accommodates spring 502. Thus, spring 502 is interposed between the actuation plug 504 and switch element S1. Those of ordinary skill in the art will recognize that circuit board 30 is disposed inside enclosure 20 when the GFCI is assembled. As in the first embodiment, spring 502 is configured to throw the switch element S1 into the closed position when in a compressed state. Further, once plug 504 is depressed, elements 5040 and 5044 snap into place and switch element S1 is permanently disposed in the closed position.

Figure 8:
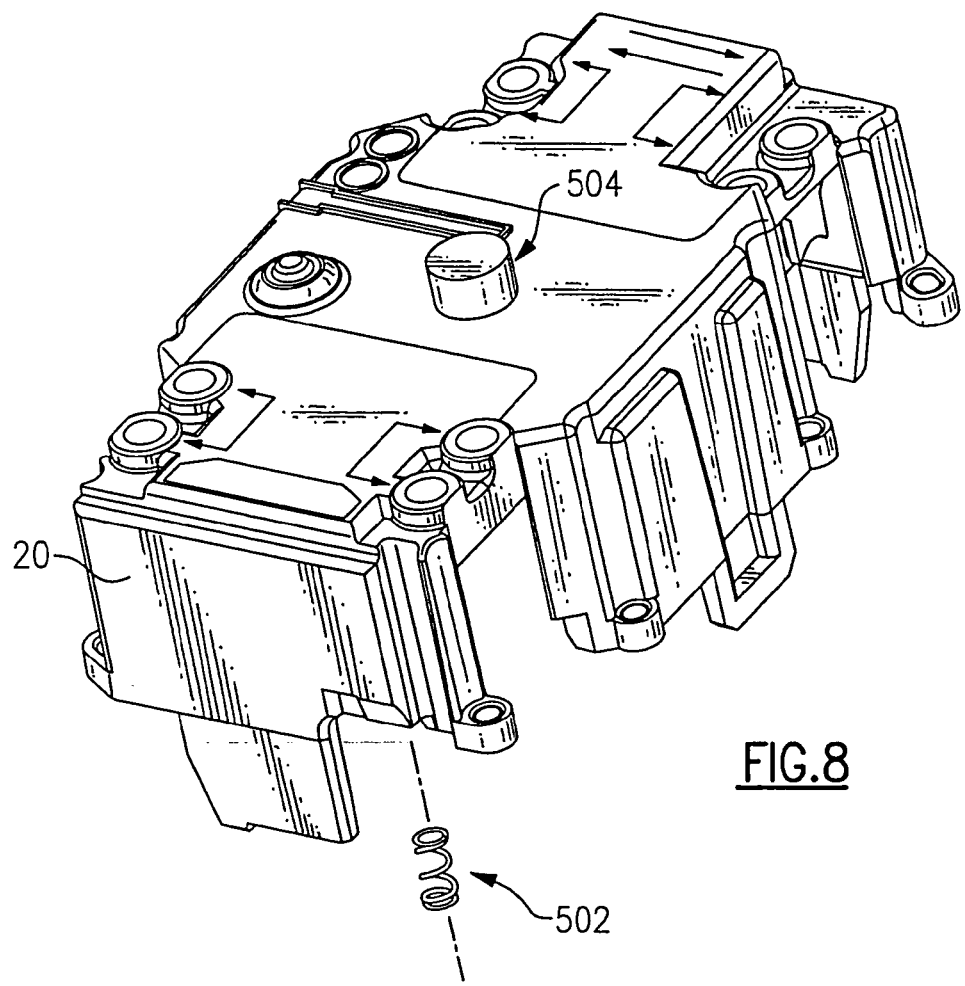
FIG. 8 is a perspective view of the top portion of the GFCI enclosure in accordance with a third embodiment of the present invention.
Figure 9:
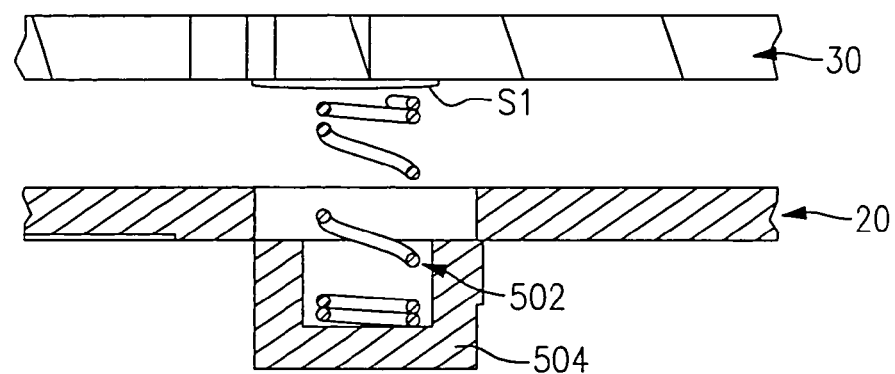
FIG. 9 is a detail view of the actuation plug depicted in FIG. 8.

As embodied herein, and depicted in FIG. 8, a perspective view of protection switch 500 in accordance with a third embodiment of the present invention is disclosed. Protection switch 500 includes an actuation button integrated into housing 20. Referring to FIG. 9, a detail view of the protection switch 500 depicted in FIG. 8 is disclosed. Spring 502 is coupled to actuation button 504 and interposed between actuation button 504 and switch element S1. S1 is mounted on PC board 30. When button 504 is depressed, spring 502 is operative to compress switch element S1 into the closed position. Further, a portion of button 504 will shear off and snap into housing 20, such that the switch element is permanently in the closed position.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A ground fault circuit interrupt (GFCI) device, comprising:
    a GFCI device housing;
    a GFCI circuit enclosed within GFCI device housing, the GFCI circuit being configured to detect at least one ground fault condition;
    a second detection circuit coupled to the GFCI circuit and disposed within the GFCI device housing, the second detection circuit including a switch element configured to be in an open position during at least one post-manufacture test procedure and configured to be in a closed position during usage; and
    a protection switch disposed on the GFCI device housing and operatively coupled to the switch element, the protection switch being configured to allow a user to throw the switch element into the closed position without accessing the interior of the GFCI device housing.

2. The device of claim 1, wherein the second detection circuit includes a mis-wiring detection circuit.

3. The device of claim 1, wherein the second detection circuit includes a circuit configured to detect internal GFCI component failure.

4. The device of claim 3, wherein the GFCI component includes a solenoid.

5. The device of claim 3, wherein the GFCI component includes a rectifier device.

6. The device of claim 3, wherein the GFCI component includes a fault detection integrated circuit.

7. The device of claim 1, wherein the protection circuit further comprises:

an actuation plug inserted into an opening in the GFCI device housing;

a spring element coupled to the actuation button and interposed between the actuation button and the switch element, the spring element being configured to throw the switch element into the closed position when in a compressed state.

8. The device of claim 7, wherein the actuation button is configured to snap-into the GFCI device housing when depressed, such that the switch element is permanently in the closed position.

9. The device of claim 7, wherein the actuation plug and the GFCI housing are comprised of a non-conductive material.

10. The device of claim 9, wherein the non-conductive material is a thermoplastic material.

11. The device of claim 1, wherein the protection circuit further comprises:

an actuation plug integrated into the GFCI device housing;

a spring element coupled to the actuation button and interposed between the actuation button and the switch element, the spring element being configured to throw the switch element into the closed position when in a compressed state.

12. The device of claim 11, wherein the actuation button is configured to snap-into the GFCI device housing when depressed, such that the switch element is permanently in the closed position.

13. The device of claim 11, wherein the actuation plug and the GFCI housing are comprised of a non-conductive material.

14. The device of claim 13, wherein the non-conductive material is a thermoplastic material.

15. The device of claim 1, wherein the protection circuit further comprises:

a bubble member coupled to the GFCI housing, the bubble member including an actuation button and a domed wall member connecting the actuation button to the GFCI device housing; and a spring element coupled to the actuation button and interposed between the actuation button and the switch element, the spring element being configured to throw the switch element into the closed position when in a compressed state.

16. The device of claim 15, wherein the domed wall member is permanently deformed by compressing the actuation button, such that the switch element is permanently in the closed position.

17. The device of claim 15, wherein the bubble member and the GFCI housing are comprised of a non-conductive material.

18. The device of claim 17, wherein the non-conductive material is a thermoplastic material.

19. A method for making a ground fault circuit interrupt (GFCI) device, the method comprising:

providing a housing;

enclosing a GFCI circuit within the housing, the GFCI circuit being configured to detect at least one ground fault condition, the GFCI circuit including a second detection circuit, the second detection circuit, the second detection circuit including a switch element that is configured to be in an open position during at least one post-manufacture test procedure and in a closed position during usage;

disposing a protection switch on the GFCI device housing, the protection switch being operatively coupled to the switch element;

performing the at least one post-manufacture test procedure with the switch element in an open position, the GFCI circuit, the second detection circuit, and the switch element being inaccessibly disposed within the housing; and actuating the protection switch to throw the switch element into the closed position, whereby the GFCI device becomes operational.

20. The method of claim 19, wherein the second detection circuit includes a mis-wiring detection circuit, the at least one test being configured to test the mis-wiring detection circuit.

21. The method of claim 19, wherein the second detection circuit includes a circuit configured to detect internal GFCI component failure.

22. The method of claim 19, wherein the at least one test includes a current surge test.

23. The method of claim 19, wherein the at least one test includes a reverse line-load mis-wire test.

24. The method of claim 19, wherein the at least one test includes an over voltage test.

25. The method of claim 19, wherein the at least one test includes a low current leakage test.

26. The method of claim 19, wherein the at least one test includes a high current leakage test.

27. The method of claim 19, wherein the at least one test includes an incorrect ground test.

28. The method of claim 19, wherein the at least one test includes a false GFCI tripping test.

* * * * *